(12) United States Patent
Northrop et al.

(10) Patent No.: US 9,739,529 B2
(45) Date of Patent: Aug. 22, 2017

(54) METHOD AND SYSTEM FOR SEPARATING FLUIDS IN A DISTILLATION TOWER

(71) Applicants: P. Scott Northrop, Spring, TX (US); Jaime A. Valencia, Houston, TX (US)

(72) Inventors: P. Scott Northrop, Spring, TX (US); Jaime A. Valencia, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 250 days.

(21) Appl. No.: 14/700,993

(22) Filed: Apr. 30, 2015

(65) Prior Publication Data

US 2016/0010917 A1 Jan. 14, 2016

Related U.S. Application Data

(60) Provisional application No. 62/022,072, filed on Jul. 8, 2014.

(51) Int. Cl.
*F25J 3/06* (2006.01)
*F25J 3/02* (2006.01)

(52) U.S. Cl.
CPC ......... *F25J 3/0214* (2013.01); *F25J 3/0209* (2013.01); *F25J 3/0233* (2013.01); *F25J 3/0266* (2013.01); *F25J 3/0295* (2013.01); *F25J 2200/02* (2013.01); *F25J 2200/30* (2013.01); *F25J 2200/50* (2013.01); *F25J 2200/74* (2013.01); *F25J 2205/04* (2013.01);
(Continued)

(58) Field of Classification Search
CPC F25J 3/0695; F25J 3/061; F25J 3/0266; F25J 3/0209; F25J 3/067; F25J 3/2033; F25J 3/0635; F25J 2220/66; F25J 2220/82; F25J 2220/60; F25J 2205/04; F25J 2210/60; F25J 2280/40; F25J 2290/40
See application file for complete search history.

(56) References Cited

U.S. PATENT DOCUMENTS

| 4,383,841 A | 5/1983 | Ryan et al. ............... 62/17 |
| 4,417,909 A | 11/1983 | Weltmer ................... 62/12 |

(Continued)

OTHER PUBLICATIONS

U.S. Appl. No. 14/516,683, filed Oct. 17, 2014, Valencia, J. A. et al.
(Continued)

*Primary Examiner* — Frantz Jules
*Assistant Examiner* — Brian King
(74) *Attorney, Agent, or Firm* — ExxonMobil Upstream Research Company Law Department

(57) ABSTRACT

A method and system for separating fluids in a distillation tower. The method may include feeding a stream to the distillation tower, wherein the stream includes carbon dioxide, reducing a carbon dioxide concentration of the stream received by the rectifier section by feeding a first cryogenic fluid to the controlled freeze zone section and accumulating rectifier section stream in at least one of a holding vessel and a sump of the rectifier section, and terminating reducing the carbon dioxide concentration when the carbon dioxide concentration of the stream travelling from the controlled freeze zone section to the rectifier section is less than or equal to a maximum carbon dioxide concentration. The first cryogenic fluid may comprise a substantially carbon-dioxide-free fluid.

25 Claims, 9 Drawing Sheets

(52) U.S. Cl.
CPC ........ *F25J 2205/20* (2013.01); *F25J 2210/62* (2013.01); *F25J 2235/60* (2013.01); *F25J 2245/02* (2013.01); *F25J 2280/10* (2013.01); *F25J 2280/40* (2013.01); *F25J 2290/40* (2013.01); *F25J 2290/62* (2013.01); *Y02C 10/12* (2013.01)

(56) References Cited

U.S. PATENT DOCUMENTS

| | | | |
|---|---|---|---|
| 4,462,814 A | 7/1984 | Holmes et al. | 62/17 |
| 4,533,372 A | 8/1985 | Valencia et al. | 62/12 |
| 4,636,334 A | 1/1987 | Skinner | 252/377 |
| 4,761,167 A | 8/1988 | Nicholas et al. | 62/17 |
| 4,923,493 A | 5/1990 | Valencia et al. | 62/13 |
| 5,062,270 A | 11/1991 | Haut | 62/12 |
| 5,120,338 A | 6/1992 | Potts et al. | 62/12 |
| 5,265,428 A * | 11/1993 | Valencia | B01D 3/18 202/158 |
| 5,956,971 A | 9/1999 | Cole et al. | 62/623 |
| 6,053,007 A | 4/2000 | Victory et al. | 62/619 |
| 2008/0034789 A1 | 2/2008 | Fieler et al. | 62/623 |
| 2009/0266107 A1 * | 10/2009 | Singh | B01D 3/14 62/617 |
| 2010/0018248 A1 | 1/2010 | Fieler et al. | 62/617 |
| 2012/0031144 A1 | 2/2012 | Northrop et al. | 62/617 |
| 2012/0079852 A1 | 4/2012 | Northrop et al. | 62/620 |
| 2012/0125043 A1* | 5/2012 | Cullinane | B01D 7/02 62/620 |
| 2012/0204599 A1 | 8/2012 | Northrop et al. | 62/617 |
| 2012/0279728 A1 | 11/2012 | Northrop et al. | 166/401 |
| 2013/0074541 A1 | 3/2013 | Kaminsky et al. | 62/601 |
| 2013/0098105 A1 | 4/2013 | Northrop | 62/617 |
| 2014/0137599 A1 | 5/2014 | Oelfke et al. | 62/619 |
| 2014/0338395 A1 | 11/2014 | Oelfke et al. | 62/620 |
| 2015/0013377 A1 | 1/2015 | Oelfke | 62/602 |

OTHER PUBLICATIONS

U.S. Appl. No. 14/516,686, filed Oct. 17, 2014, Valencia, J. A.
U.S. Appl. No. 14/516,689, filed Oct. 17, 2014, Cullinane, J. T. et al.
U.S. Appl. No. 14/516,705, filed Oct. 17, 2014, Valencia, J. A. et al.
U.S. Appl. No. 14/516,709, filed Oct. 17, 2014, Valencia, J. A.
U.S. Appl. No. 14/516,713, filed Oct. 17, 2014, Valencia, J. A. et al.
U.S. Appl. No. 14/516,717, filed Oct. 17, 2014, Valencia, J. A. et al.
U.S. Appl. No. 14/516,718, filed Oct. 17, 2014, Valencia, J. A.
U.S. Appl. No. 14/516,726, filed Oct. 17, 2014, Valencia, J. A. et al.
U.S. Appl. No. 14/516,731, filed Oct. 17, 2014, Valencia, J. A. et al.
U.S. Appl. No. 14/643,726, filed Mar. 10, 2015.
U.S. Appl. No. 14/661,621, filed Mar. 18, 2015.

* cited by examiner

METHOD AND SYSTEM FOR SEPARATING FLUIDS IN A DISTILLATION TOWER

CROSS REFERENCE TO RELATED APPLICATIONS

This application claims the priority benefit of U.S. patent application No. 62/022,072 filed Jul. 8, 2014 entitled METHOD AND SYSTEM FOR SEPARATING FLUIDS IN A DISTILLATION TOWER, the entirety of which is incorporated by reference herein.

BACKGROUND

Fields of Disclosure

The disclosure relates generally to the field of fluid separation. More specifically, the disclosure relates to a method and system for separating fluids in a distillation tower, such as but not limited to during start-up of a distillation tower.

Description of Related Art

This section is intended to introduce various aspects of the art, which may be associated with the present disclosure. This discussion is intended to provide a framework to facilitate a better understanding of particular aspects of the present disclosure. Accordingly, it should be understood that this section should be read in this light, and not necessarily as admissions of prior art.

The production of natural gas hydrocarbons, such as methane and ethane, from a reservoir oftentimes carries with it the incidental production of non-hydrocarbon gases. Such gases include contaminants, such as at least one of carbon dioxide ("$CO_2$"), hydrogen sulfide ("$H_2S$"), carbonyl sulfide, carbon disulfide, and various mercaptans. When a feed stream being produced from a reservoir includes these contaminants mixed with hydrocarbons, the stream is oftentimes referred to as "sour gas."

Many natural gas reservoirs have relatively low percentages of hydrocarbons and relatively high percentages of contaminants. Contaminants may act as a diluent and lower the heat content of hydrocarbons. Additionally, in the presence of water some contaminants can become quite corrosive.

It is desirable to remove contaminants from a stream containing hydrocarbons to produce sweet and concentrated hydrocarbons. Specifications for pipeline quality natural gas typically call for a maximum of 2-4% $CO_2$ and ¼ grain $H_2S$ per 100 standard cubic feet (scf) (4 parts per million volume (ppmv) or 5 milligrams per normal meter cubed (mg/Nm$^3$) $H_2S$. Specifications for lower temperature processes such as natural gas liquefaction plants or nitrogen rejection units typically require less than 50 parts per million (ppm) $CO_2$.

Separating contaminants from hydrocarbons is difficult. Consequently, significant work has been applied to the development of hydrocarbon/contaminant separation methods. These methods can be placed into three general classes: absorption by solvents (physical, chemical, and hybrids), adsorption by solids, and distillation.

Separation by distillation of some mixtures can be relatively simple and, as such, is widely used in the natural gas industry. However, distillation of mixtures of natural gas hydrocarbons, primarily methane, and one of the most common contaminants in natural gas, carbon dioxide, can present significant difficulties. Conventional distillation principles and conventional distillation equipment are predicated on the presence of only vapor and liquid phases throughout the distillation tower. The separation of $CO_2$ from methane by distillation involves temperature and pressure conditions that result in solidification of $CO_2$ if a pipeline or better quality hydrocarbon product is desired. The required temperatures are cold temperatures typically referred to as cryogenic temperatures.

Certain cryogenic distillations can overcome the above mentioned difficulties. These cryogenic distillations provide the appropriate mechanism to handle the formation and subsequent melting of solids during the separation of solid-forming contaminants from hydrocarbons. The formation of solid contaminants in equilibrium with vapor-liquid mixtures of hydrocarbons and contaminants at particular conditions of temperature and pressure takes place in a controlled freeze zone section of a cryogenic distillation tower.

During normal operation, the cryogenic distillation tower operates at steady-state temperature conditions. During normal operation, the operating temperature of the top two sections that may be in a distillation tower, e.g., the controlled freeze zone section, and the upper section, are cold. As a result of the cold operating temperatures, the concentration of $CO_2$ within the upper section and the controlled freeze zone section of the distillation tower is low; the $CO_2$ is knocked down by cold liquid sprays from a spray assembly within the controlled freeze zone section.

During abnormal operations, the cryogenic distillation tower does not operate at steady-state temperature conditions. The operating temperatures of the three main sections that may be in a distillation tower are not cold. As a result, the warmer operating temperatures prevent sufficient $CO_2$ from being knocked out, thereby leading to a higher concentration of $CO_2$ within the upper section and the controlled freeze zone section of the distillation tower than would be present during normal operation. The increased $CO_2$ concentration may result in $CO_2$ solidifying outside of the middle controlled freeze zone section. The challenge during an abnormal operation is to get from an abnormal operation to a normal operation. Examples of when abnormal operations may occur include but are not limited to during start-up of the distillation tower. During start-up, the distillation tower may be at or near-ambient temperatures.

A need exists for improved technology that can better facilitate going from an abnormal operation to a normal operation so as to separate fluids in a distillation tower, such as but not limited to during start-up of a distillation tower.

SUMMARY

The present disclosure provides a method and system for separating fluids in a distillation tower.

A method for separating fluids in a distillation tower may comprise maintaining a rectifier section in the distillation tower; maintaining a controlled freeze zone section in the distillation tower that forms solids from carbon dioxide within the distillation tower; feeding a stream to the distillation tower, wherein the stream comprises the carbon dioxide; reducing a carbon dioxide concentration of the stream received by the rectifier section by: feeding a first cryogenic fluid to the controlled freeze zone section, wherein the first cryogenic fluid comprises a substantially carbon dioxide free fluid; and accumulating rectifier section stream in at least one of a holding vessel and a sump of the rectifier section; and terminating reducing the carbon dioxide concentration when the carbon dioxide concentration of the stream travelling from the controlled freeze zone section to the rectifier section is less than or equal to a maximum carbon dioxide concentration.

A system for separating fluids in a distillation tower may comprise a rectifier section in the distillation tower; a controlled freeze zone section in the distillation tower that forms solids from carbon dioxide within a stream that enters the distillation tower; a first cryogenic fluid pump outside of the distillation tower that is configured to increase a pressure of a first cryogenic fluid; a first cryogenic heat exchanger outside of the distillation tower that is configured to receive the first cryogenic fluid from the first cryogenic fluid pump and to increase a temperature of the first cryogenic fluid; and a spray assembly configured to spray the first cryogenic fluid into the controlled freeze zone section, wherein the first cryogenic fluid comprises a substantially carbon dioxide free fluid.

The foregoing has broadly outlined the features of the present disclosure so that the detailed description that follows may be better understood. Additional features will also be described herein.

BRIEF DESCRIPTION OF THE DRAWINGS

These and other features, aspects and advantages of the disclosure will become apparent from the following description, appending claims and the accompanying drawings, which are briefly described below.

Figure 1:
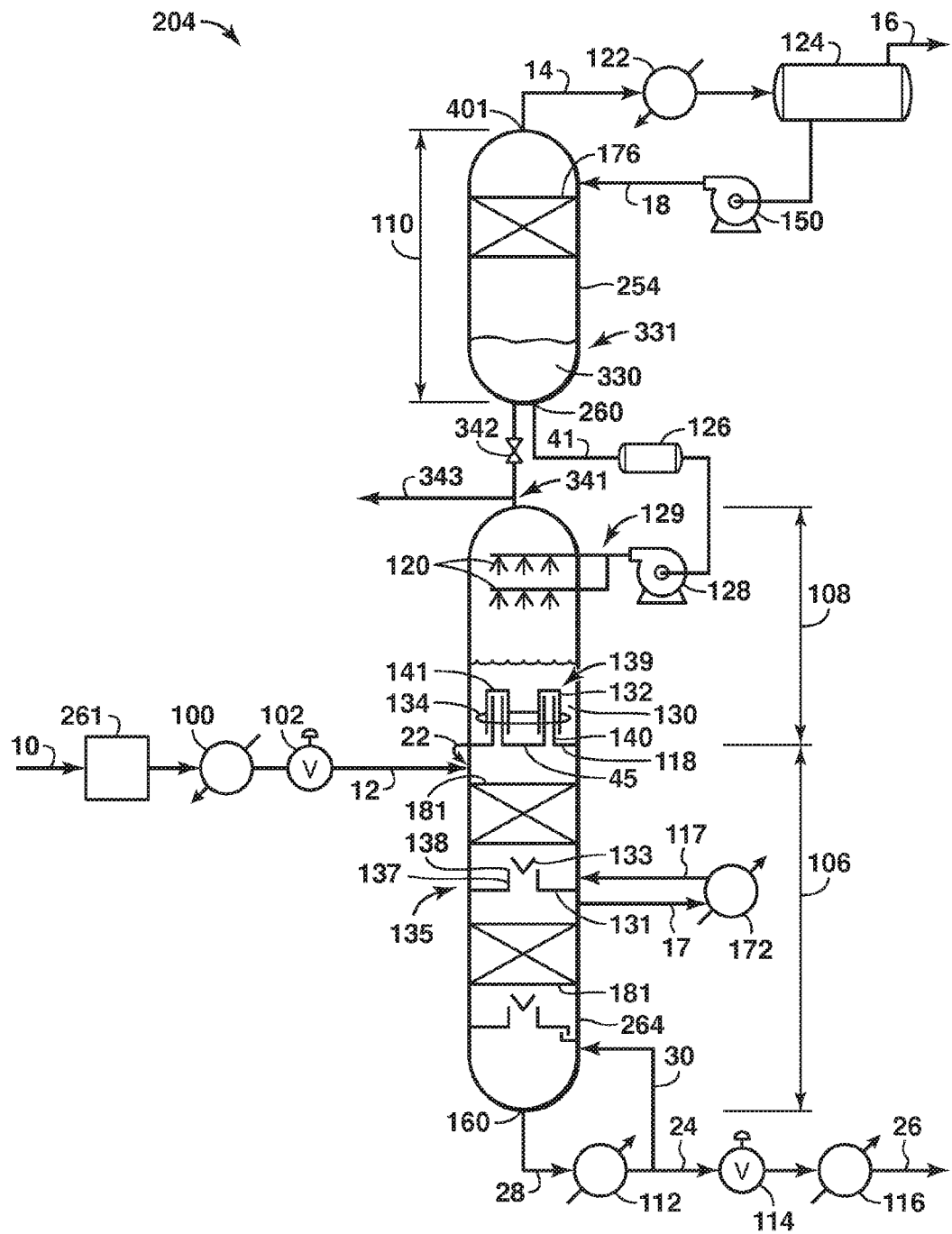
FIG. 1 is a schematic diagram of a distillation tower with sections within multiple vessels.
Figure 2:
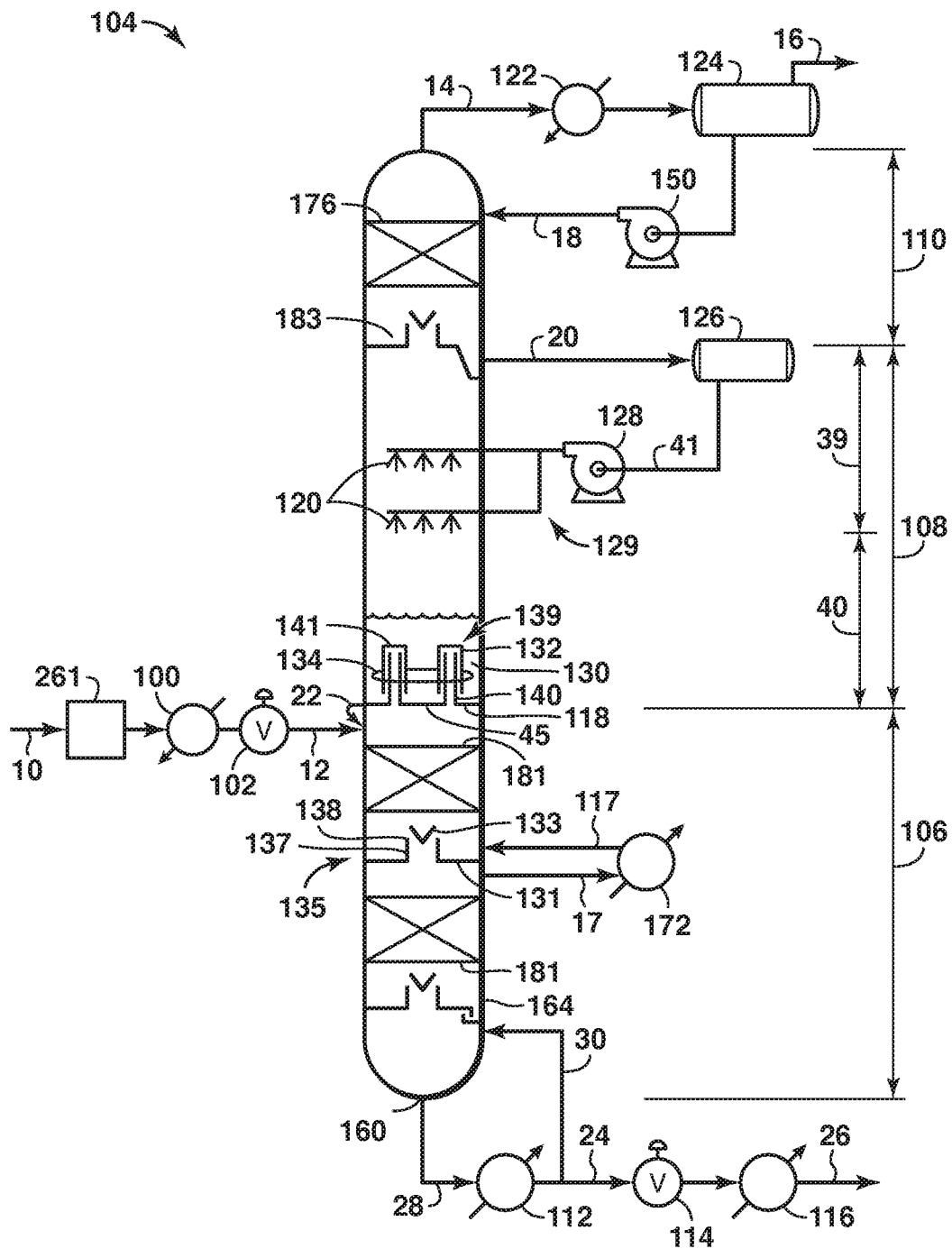
FIG. 2 is a schematic diagram of a distillation tower with sections within a single vessel.

It should be noted that the figures are merely examples and no limitations on the scope of the present disclosure are intended thereby. Further, the figures are generally not drawn to scale, but are drafted for purposes of convenience and clarity in illustrating various aspects of the disclosure.

DETAILED DESCRIPTION

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

At the outset, for ease of reference, certain terms used in this application and their meaning as used in this context are set forth below. To the extent a term used herein is not defined below, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions or at ambient conditions (25 degrees Celsius (° C.) and 1 atmosphere (atm) pressure). Hydrocarbon fluids may include, for example, oil, natural gas, coal bed methane, shale oil, pyrolysis oil, pyrolysis gas, a pyrolysis product of coal, and other hydrocarbons that are in a gaseous or liquid state.

The term "mass transfer device" refers to any object that receives fluids to be contacted, and passes those fluids to other objects, such as through gravitational flow.

As used herein, the term "fluid" refers to gases, liquids, and combinations of gases and liquids, as well as to combinations of gases and solids, and combinations of liquids and solids.

As used herein, the term "closed loop refrigeration system" refers to a configuration where the overhead stream of a distillation process having a controlled freeze zone section is chilled and partially condensed with an external working fluid. The external working fluid does not physically mix with the overhead stream. The external working fluid only exchanges heat with the overhead stream. The overhead stream is the stream exiting a top of an upper section of the distillation tower. A closed loop melt tray temperature conditioning system in the distillation process is part of a closed loop refrigeration system.

As used herein, the term "open loop refrigeration system" refers to a configuration where the overhead stream is used to assist in providing cooling. A compressor may be used to assist in providing the cooling. An open loop melt tray temperature conditioning system in the distillation process is part of an open loop refrigeration system.

As used herein, the term "normal operation" is when the distillation tower operates at steady-state conditions.

As used herein, the term "abnormal operation" is when the distillation tower does not operate at steady-state conditions. An example of an abnormal operation includes but is not limited to during start-up of a distillation tower. Start-up may include the initial start-up of the distillation tower (i.e., when the distillation tower is first used). Start-up may include any time after the initial start-up of the distillation tower (e.g., a time after the distillation tower has been temporarily shut-down).

As used herein, the term "subsurface" refers to geologic strata occurring below the earth's surface.

A "reservoir" or "subterranean reservoir" is a subsurface rock or sand formation from which a production fluid or resource can be harvested. The rock formation may include sand, granite, silica, carbonates, clays, and organic matter, such as heavy oil (e.g., bitumen), gas, or coal, among others. Reservoirs can vary in thickness from less than one foot (0.3048 meter (m)) to hundreds of feet (hundreds of meters). The resource is generally a deposit of hydrocarbons.

The term "steady-state condition" refers to when the key distillation process operating variables, e.g., pressure, temperature, composition, and flows, have not fluctuated substantially for some period of time (e.g., hours). The period of time may range from greater than or equal to 15 minutes. The period of time may be any number within or bounded by the preceding range. When not at steady-state conditions, the distillation process may be at a transient state on its way to normal operation.

The terms "substantial," "approximate," "sufficient" and "about" when used in reference to a quantity or amount of a material, or a specific characteristic thereof, refer to an amount that is sufficient to provide an effect that the material or characteristic was intended to provide. The exact degree of deviation allowable may in some cases depend on the specific context.

As referenced in this application, the terms "stream," "gas stream," "vapor stream," and "liquid stream" refer to different stages of a feed stream as the feed stream is processed in a distillation tower that separates methane, the primary hydrocarbon in natural gas, from contaminants. Although the phrases "gas stream," "vapor stream," and "liquid stream," refer to situations where a gas, vapor, and liquid is mainly present in the stream, respectively, there may be other phases also present within the stream. For example, a gas may also be present in a "liquid stream." In some instances, the terms "gas stream" and "vapor stream" may be used interchangeably. The feed stream may interchangeably be referred to as a stream.

A "flow controlling device" refers to any suitable device that can control pressure and flow. A flow controlling device being "open" refers to the flow controlling device being anywhere from partially open to completely open. A flow controlling device may be bi-directional whether specified or not as such.

The articles "the", "a" and "an" are not necessarily limited to mean only one, but rather are inclusive and open ended so as to include, optionally, multiple such elements.

"At least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, to at least one, optionally including more than one, A, with no B present (and optionally including entities other than B); to at least one, optionally including more than one, B, with no A present (and optionally including entities other than A); to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

The disclosure relates to a system and method for separating fluids within a distillation tower such as but not limited to during abnormal operations. FIGS. 1-9 of the disclosure display various aspects of the system and method. The system may comprise a closed loop refrigeration system or an open loop refrigeration system.

The system and method may separate a feed stream, having hydrocarbons (e.g., methane) and contaminants, in a distillation tower 104, 204. The system may comprise the distillation tower 104, 204 (FIGS. 1-8). The distillation tower 104, 204 may separate the contaminants from the hydrocarbons.

The distillation tower 104, 204 may be separated into three functional sections: a lower section 106, a middle controlled freeze zone section 108 and an upper section 110. The distillation tower 104, 204 may incorporate three functional sections when the upper section 110 is needed and/or desired. The lower section 106 may interchangeably be referred to as a stripper section. The middle controlled freeze zone section 108 may interchangeably be referred to as a controlled freeze zone section. The upper section 110 may interchangeably be referred to as a rectifier section.

The distillation tower 104, 204 may incorporate only two functional sections when the upper section 110 is not needed and/or desired. When the distillation tower does not include an upper section 110, a portion of vapor leaving the middle controlled freeze zone section 108 may be condensed in a condenser 122 and returned to the middle controlled freeze zone section 108 as a liquid stream via a spray assembly 129. Line 41 may be eliminated. The stream in line 14, now taking the vapors leaving the middle controlled freeze section 108, directs these vapors to the condenser 122.

The sections of the distillation tower 104 may be housed within a single vessel (FIGS. 2, 4 and 7-8). For example, the lower section 106, the middle controlled freeze zone section 108, and the upper section 110 may be housed within a single vessel 164.

The sections of the distillation tower 204 may be housed within a plurality of vessels to form a split-tower configuration (FIGS. 1, 3 and 5-6). Each of the vessels may be separate from the other vessels. A line 341 and/or another suitable mechanism may connect one vessel to another vessel so that a vapor stream may travel from the middle controlled freeze zone section 108 to the upper section 110. Before one vessel is connected to another vessel, the vapor stream travelling from the middle controlled freeze zone section 108 may exit the middle controlled freeze zone section 108 and travel away from the upper section 110 via line 343. The vapor stream travelling from the middle controlled freeze zone section 108 may travel away from the upper section 110 via line 343 during abnormal operation. To prevent the vapor stream from travelling from the middle controlled freeze zone section 108 to the upper section 110, before one vessel is connected to another vessel, line 341 may include a flow controlling device 342. The flow controlling device 342 may comprise, but is not limited to, a valve.

In the split-tower configuration, the lower section 106, middle controlled freeze zone section 108 and upper section 110 may be housed within two or more vessels. For example, the upper section 110 may be housed within a single vessel 254 and the lower and middle controlled freeze zone sections 106, 108 may be housed within a single vessel 264. When this is the case, a liquid stream exiting the upper section 110, may exit through a liquid outlet bottom 260. The liquid outlet bottom 260 is at the bottom of the upper section 110. Although not shown, each of the sections may be housed within its own separate vessel, or one or more sections may be housed within separate vessels, or the upper and middle controlled freeze zone sections may be housed within a single vessel and the lower section may be housed within a single vessel, etc. When sections of the distillation tower are housed within vessels, the vessels may be side-by-side along a horizontal line and/or above each other along a vertical line.

The split-tower configuration may be beneficial in situations where the height of the distillation tower, motion considerations, and/or transportation issues, such as for remote locations, need to be considered. This split-tower configuration allows for the independent operation of one or more sections. For example, when the upper section is housed within a single vessel and the lower and middle controlled freeze zone sections are housed within a single vessel, independent generation of reflux using a substantially contaminant-free, largely hydrocarbon stream from a packed gas pipeline or an adjacent hydrocarbon line, may occur in the upper section. And the reflux may be used to cool the upper section, establish an appropriate temperature profile in the upper section, and/or build up liquid inventory at the bottom of the upper section to serve as an initial source of spray liquids for the middle controlled freeze zone section. Moreover, the middle controlled freeze zone and lower sections may be independently prepared by chilling the feed stream, feeding it to the optimal location be that in the lower section or in the middle controlled freeze zone section, generating liquids for the lower and the middle controlled freeze zone sections, and disposing the vapors off the middle controlled freeze zone section while they are off specification with too high a contaminant content. Also, liquid from the upper section may be intermittently or continuously sprayed, building up liquid level in the bottom of the middle controlled freeze zone section and bringing the contaminant content in the middle controlled freeze zone section down and near steady state level so that the two vessels may be connected to send the vapor stream from the middle controlled freeze zone section to the upper section, continuously spraying liquid from the bottom of the upper section into the middle controlled freeze zone section and stabilizing operations into operating at a steady-state temperature. The split tower configuration may utilize a sump 331 of the upper section as a liquid receiver. The sump 331 may be the liquid receiver for a pump 128. When the split tower configuration utilizes the sump 331, the distillation tower 204 may or may not utilize a holding vessel 126 (FIGS. 1-8).

The system may include a heat exchanger 100 (FIGS. 1-8). A feed stream 10 may enter the heat exchanger 100 before entering the distillation tower 104, 204. The feed stream 10 may interchangeably be referred to as a stream. The stream 10 may be cooled within the heat exchanger 100. The heat exchanger 100 helps drop the temperature of the stream 10 to a level suitable for introduction into the distillation tower 104, 204.

The system may include an expander device 102 (FIGS. 1-8). The stream 10 may enter the expander device 102 before entering the distillation tower 104, 204. The stream 10 may be expanded in the expander device 102 after exiting the heat exchanger 100. The expander device 102 helps drop the temperature of the stream 10 to a level suitable for introduction into the distillation tower 104, 204. The expander device 102 may be any suitable device, such as a valve. If the expander device 102 is a valve, the valve may be any suitable valve that may aid in cooling the stream 10 before it enters the distillation tower 104, 204. For example, the valve 102 may comprise a Joule-Thompson (J-T) valve.

Figure 3:
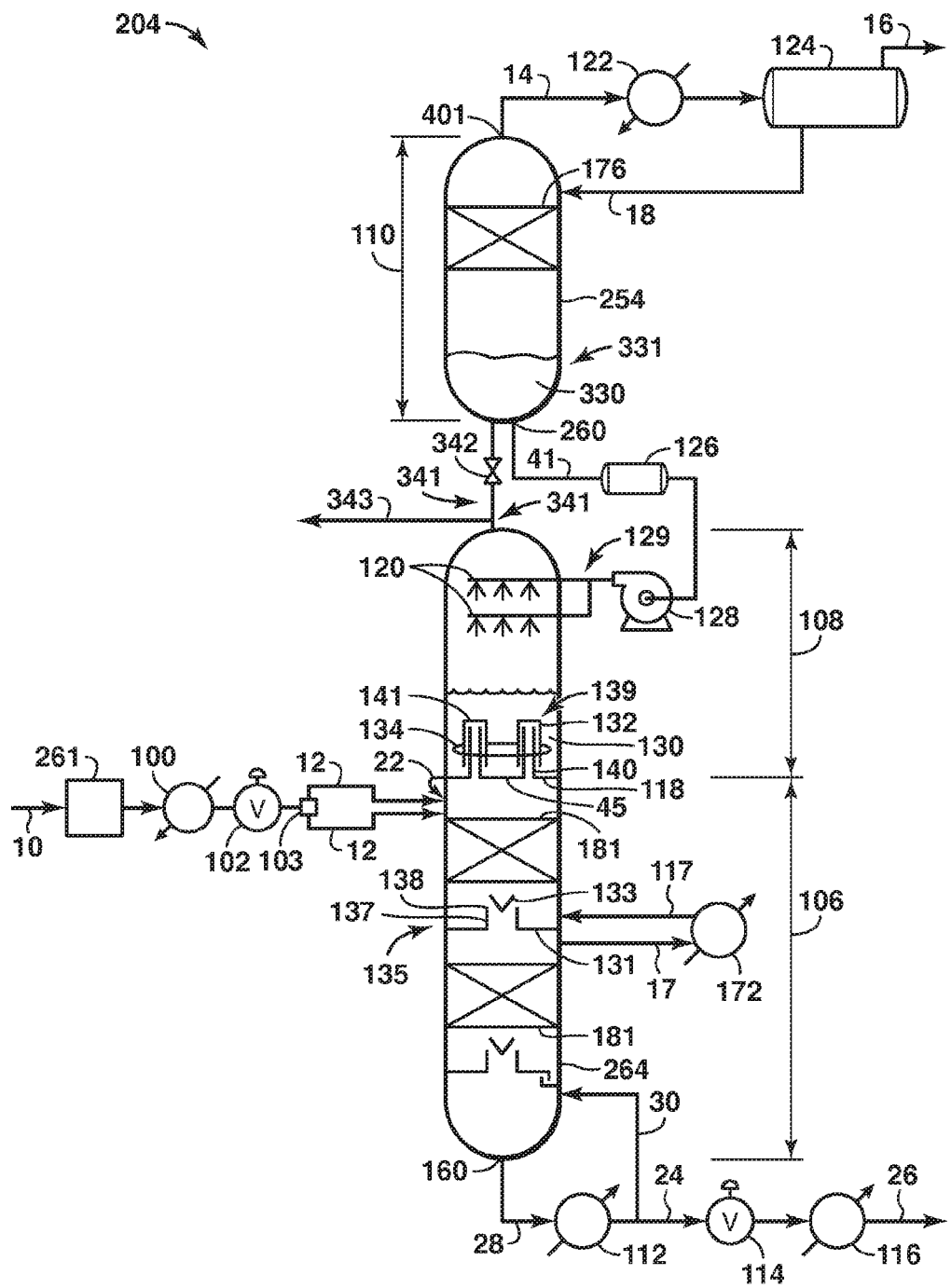
FIG. 3 is a schematic diagram of a distillation tower with sections within multiple vessels.
Figure 4:
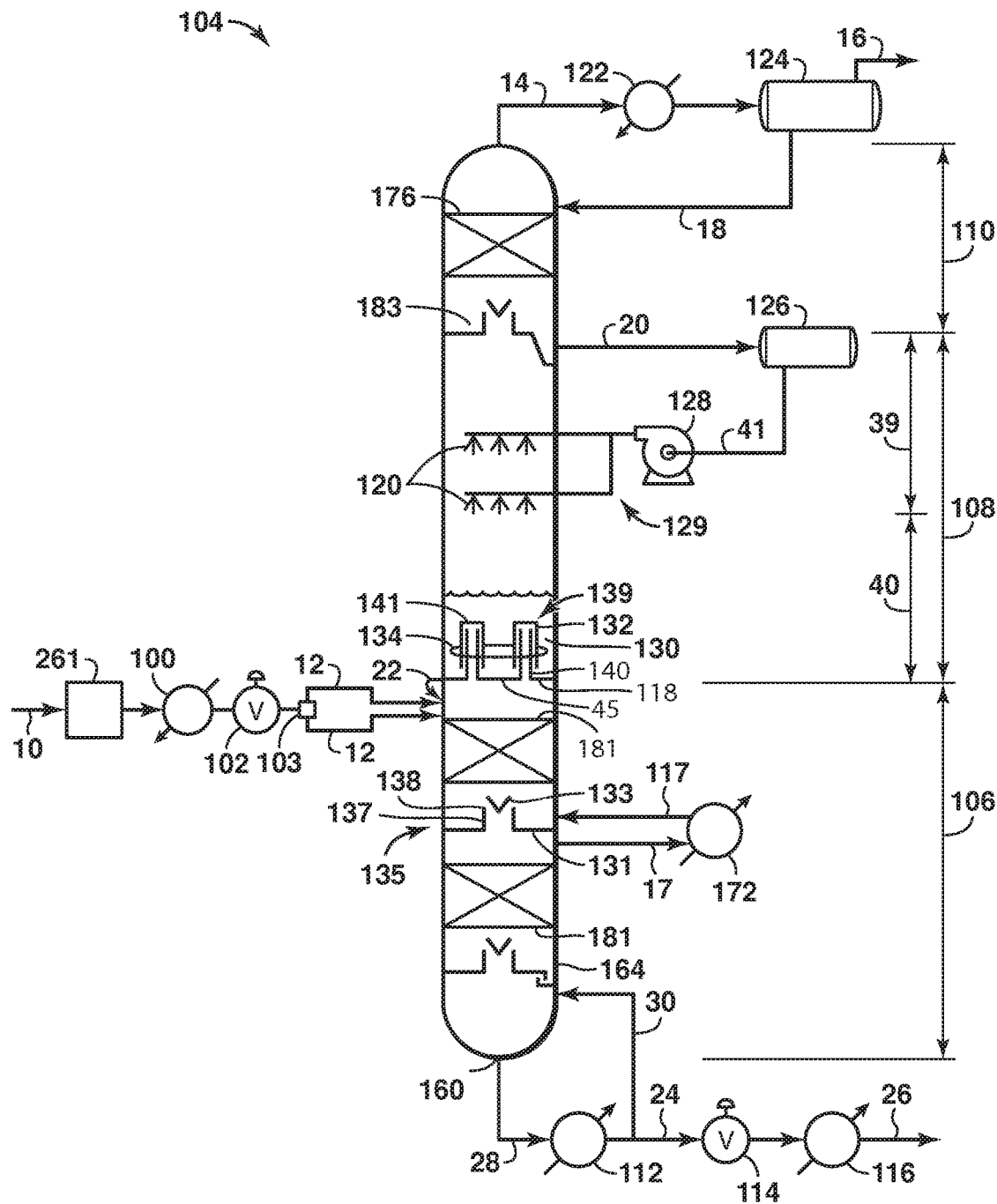
FIG. 4 is a schematic diagram of a distillation tower with sections within a single vessel.
Figure 5:
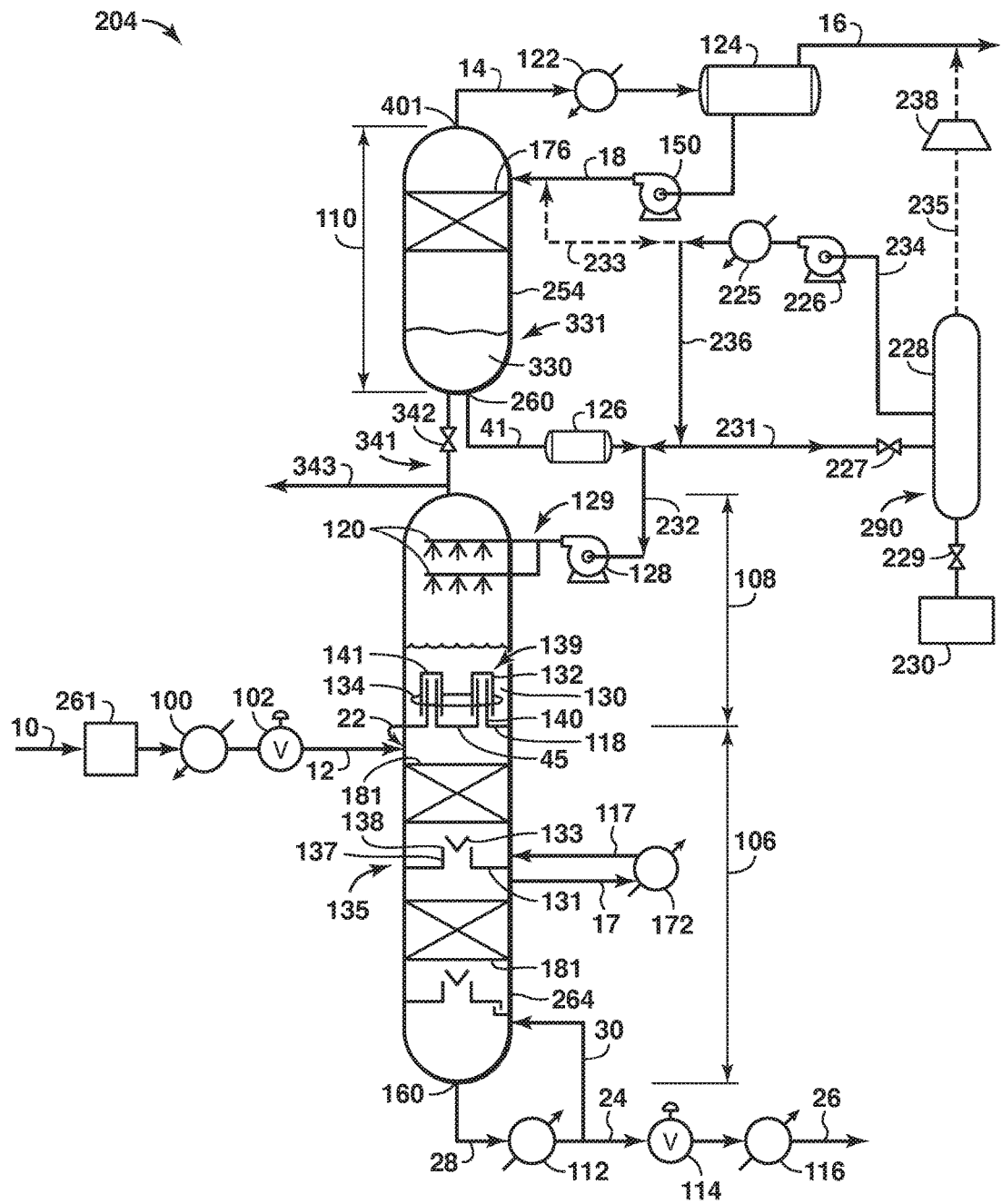
FIG. 5 is a schematic diagram of a distillation tower with sections within multiple vessels during startup.
Figure 6:
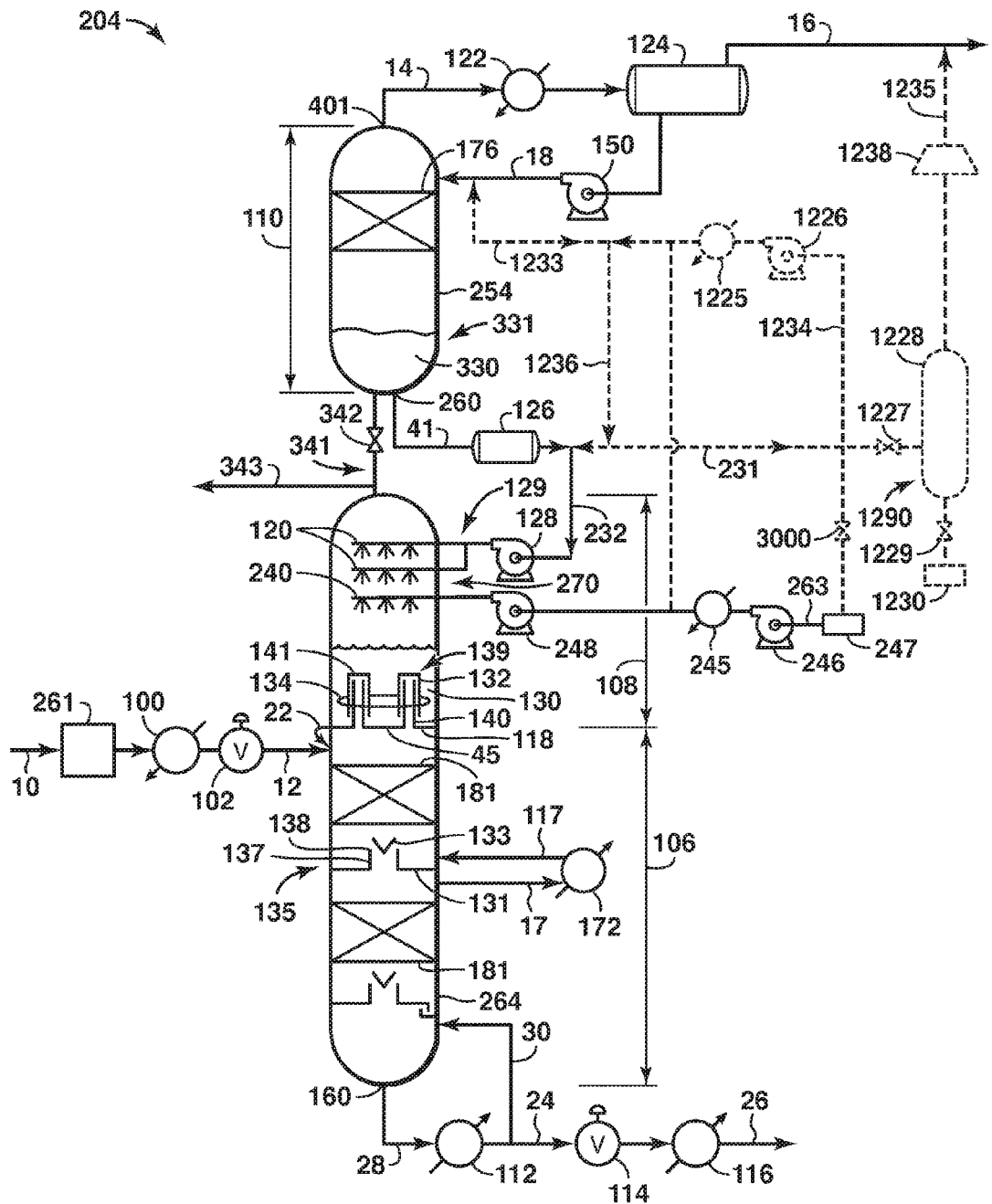
FIG. 6 is a schematic diagram of a distillation tower with sections within multiple vessels during startup.
Figure 7:
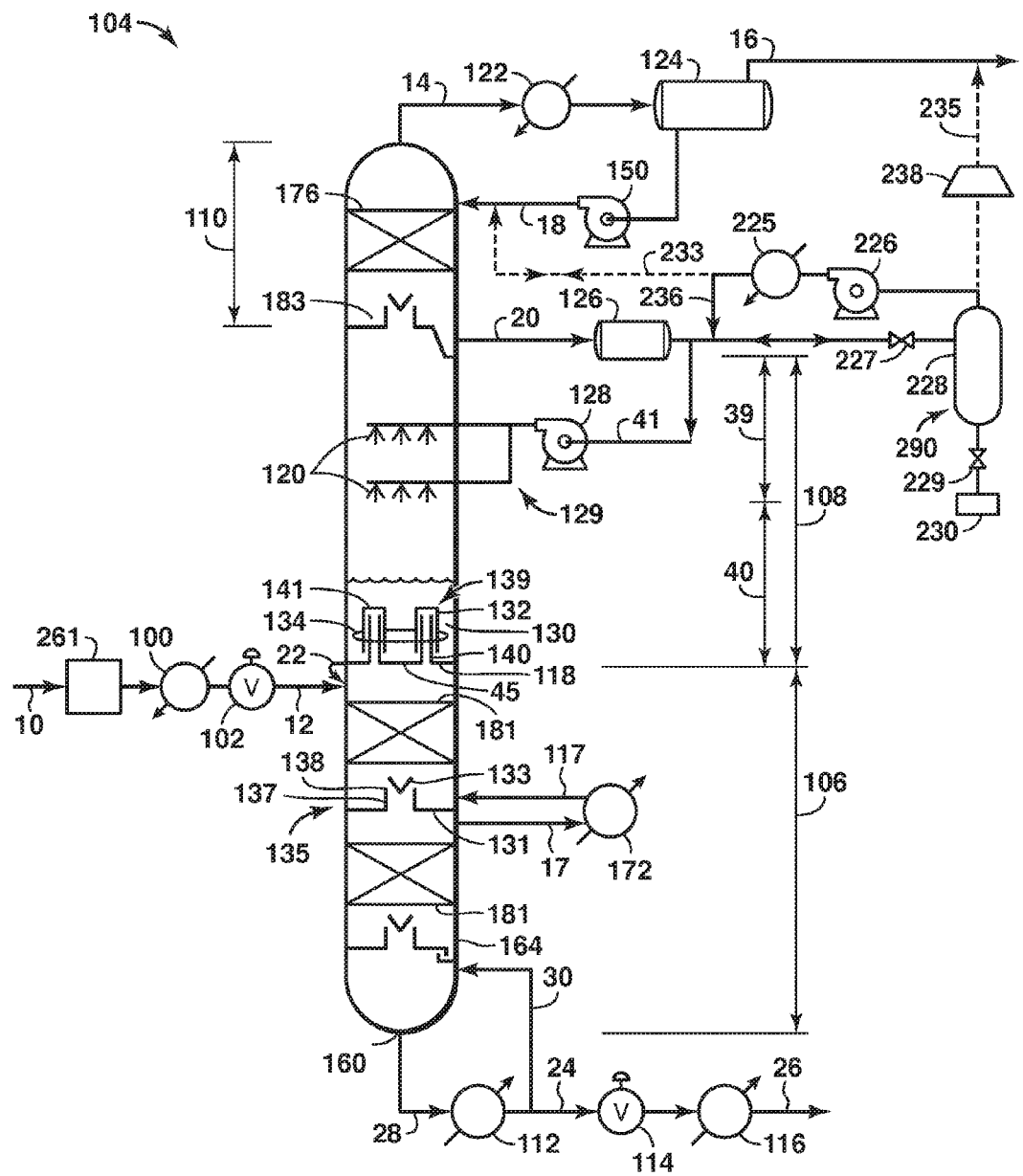
FIG. 7 is a schematic diagram of a distillation tower with sections within a single vessel during startup.
Figure 8:
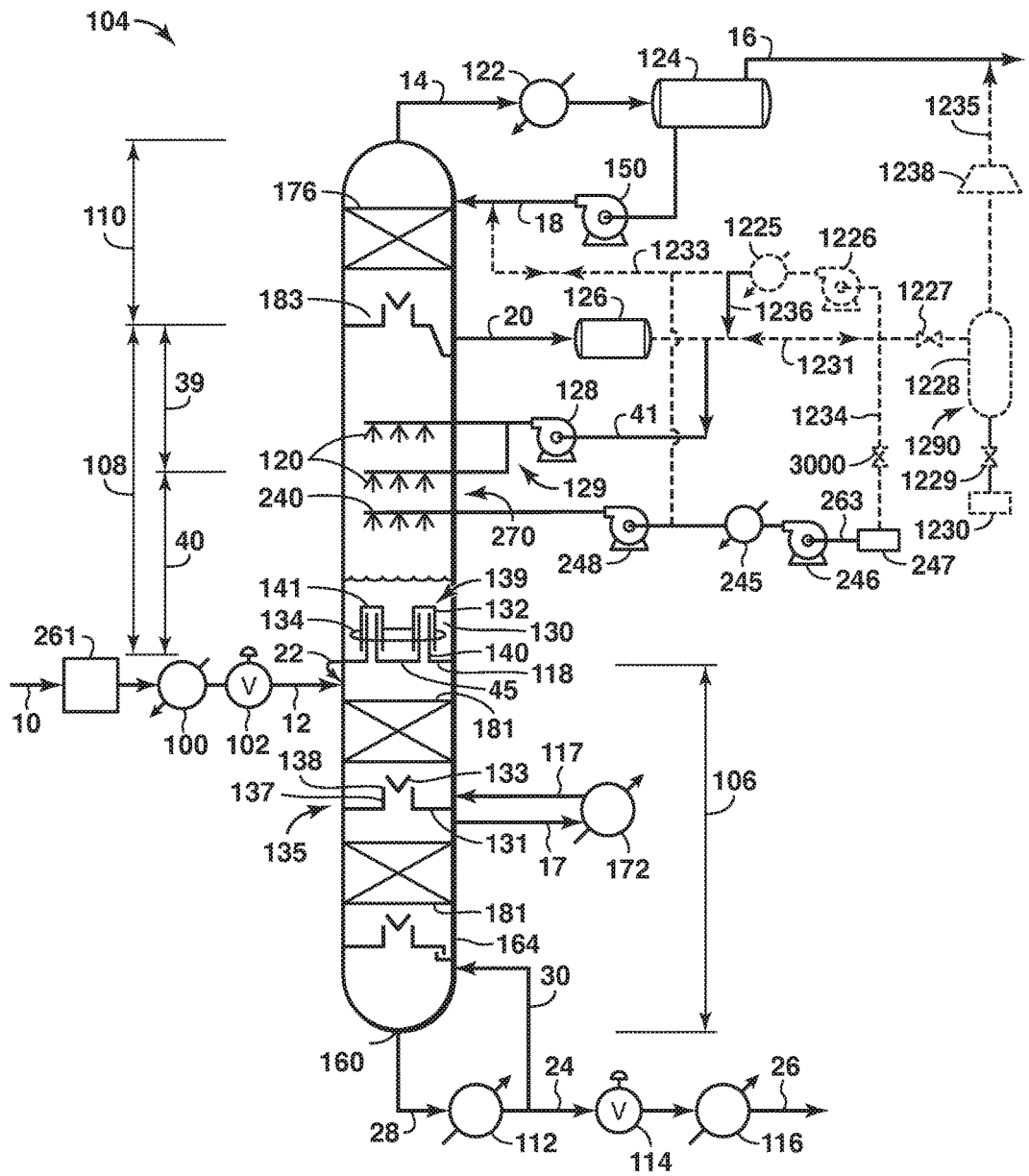
FIG. 8 is a schematic diagram of a distillation tower with sections within a single vessel during startup.

The system may include a feed separator 103 (FIGS. 3-4). The stream may enter the feed separator 103 before entering the distillation tower 104, 204. The feed separator 103 may separate a stream 10 having a mixed liquid and vapor stream into a liquid stream and a vapor stream. Lines 12 may extend from the feed separator 103 to the distillation tower 104, 204. One of the lines 12 may receive the vapor stream from the feed separator 103. Another one of the lines 12 may receive the liquid stream from the feed separator 103. Each of the lines 12 may extend to the same and/or different sections (i.e. middle controlled freeze zone, and lower sections) of the distillation tower 104, 204.

If the system includes a feed separator, the expander device 102 may or may not be downstream of the feed separator 103. In embodiments where the expander device 102 is downstream of the feed separator 103, the expander device 102 may comprise a plurality of expander devices 102 such that each line 12 has an expander device 102.

The system may include a dehydration unit 261 (FIGS. 1-8). The feed stream 10 may enter the dehydration unit 261 before entering the distillation tower 104, 204. The feed stream 10 enters the dehydration unit 261 before entering the heat exchanger 100 and/or the expander device 102. The dehydration unit 261 removes water from the feed stream 10 to prevent water from later presenting a problem in the heat exchanger 100, expander device 102, feed separator 103, or distillation tower 104, 204. The water can present a problem by forming a separate water phase (i.e., ice and/or hydrate) that plugs lines, equipment or negatively affects the distillation process. The dehydration unit 261 dehydrates the feed stream to a dew point sufficiently low to ensure a separate water phase will not form at any point downstream during the rest of the process. The dehydration unit may be any suitable dehydration unit, such as a molecular sieve or a glycol dehydration unit.

The system may include a filtering unit (not shown). The feed stream 10 may enter the filtering unit before entering the distillation tower 104, 204. The filtering unit may remove undesirable contaminants from the feed stream before the feed stream enters the distillation tower 104, 204. Depending on what contaminants are to be removed, the filtering unit may be before or after the dehydration unit 261 and/or before or after the heat exchanger 100.

Figure 9:
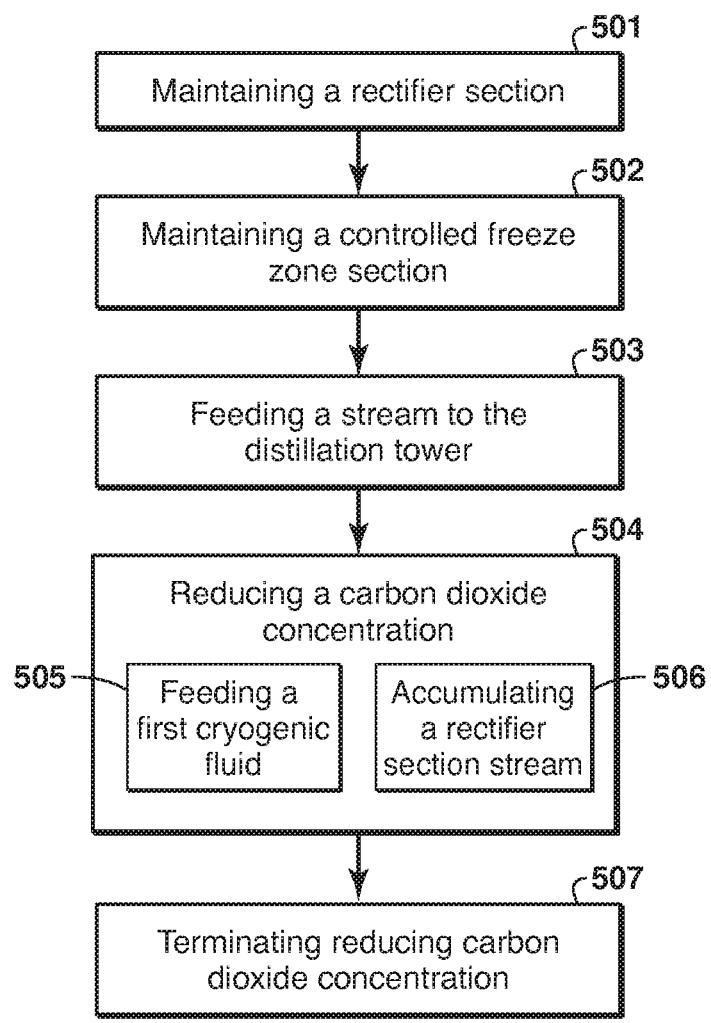
FIG. 9 is a schematic diagram of a method for separating fluids in a distillation tower.

The systems may include a line 12 (FIGS. 1-8). The line may also be referred to as an inlet channel 12. The feed stream 10 may be fed into the distillation tower 104, 204 via the line 12, 503 (FIG. 9). The feed stream 10 (i.e., stream) may comprise contaminants (e.g., carbon dioxide). The feed stream 10 may also comprise hydrocarbons (e.g., methane). The line 12 may extend to the lower section 106 or the middle controlled freeze zone section 108 of the distillation tower 104, 204. For example, the line 12 may extend to the lower section 106 such that the feed stream 10 may enter the lower section 106 of the distillation tower 104, 204 (FIGS. 1-8). The line 12 may directly or indirectly extend to the lower section 106 or the middle controlled freeze zone section 108. The line 12 may extend to an outer surface of the distillation tower 104, 204 before entering the distillation tower 104, 204.

If the system includes the feed separator 103 (FIGS. 3-4), the line 12 may comprise a plurality of lines 12. Each line 12 may be the same line as one of the lines that extends from the feed separator 103 to a specific portion of the distillation tower 104, 204.

The lower section 106 is constructed and arranged to separate the feed stream 10 into a liquid stream and a vapor stream. During normal operation, the lower section 106 separates the feed stream at a temperature and pressure at which no solids form. The liquid stream may comprise a greater quantity of contaminants than of methane. The vapor stream may comprise a greater quantity of methane than of contaminants. In any case, the vapor stream is lighter than the liquid stream. As a result, the vapor stream rises from the lower section 106 and the liquid stream falls to the bottom of the lower section 106.

The lower section 106 may include and/or connect to equipment that separates the stream. The equipment may comprise any suitable equipment for separating methane from contaminants. Generally speaking, the suitable equipment comprises some type of mass transfer device. For example, the suitable equipment may comprise one or more packed sections 181, or one or more distillation trays with perforations, downcomers, and weirs (FIGS. 1-8).

The equipment may include components that apply heat to the stream to form the vapor stream and the liquid stream. For example, the equipment may comprise a first reboiler 112 that applies heat to the stream. The first reboiler 112 may be located outside of the distillation tower 104, 204. The equipment may also comprise a second reboiler 172 that applies heat to the stream. The second reboiler 172 may be located outside of the distillation tower 104, 204. Line 17 may lead from the distillation tower to the second reboiler 172. Line 117 may lead from the second reboiler 172 to the distillation tower. Additional reboilers, set up similarly to the second reboiler described above, may also be used.

The first reboiler 112 may apply heat to the liquid stream that exits the lower section 106 through a liquid outlet 160 of the lower section 106. The liquid stream may travel from the liquid outlet 160 through line 28 to reach the first reboiler 112 (FIGS. 1-8). The amount of heat applied to the liquid stream by the first reboiler 112 can be increased to separate more methane from contaminants. The more heat applied by the reboiler 112 to the stream, the more methane separated from the liquid contaminants, though more contaminants will also be vaporized.

The first reboiler 112 may also apply heat to the stream within the distillation tower 104, 204. Specifically, the heat applied by the first reboiler 112 warms up the lower section 106. This heat travels up the lower section 106 and supplies heat to warm solids entering a melt tray assembly 139 of the middle controlled freeze zone section 108 so that the solids form a liquid slurry.

The second reboiler 172 applies heat to the stream within the lower section 106. The heat applied by the second reboiler 172 is applied closer to the middle controlled freeze zone section 108 than the heat applied by the first reboiler 112. As a result, the heat applied by the second reboiler 172 reaches the middle controlled freeze zone section 108 faster than the heat applied by the first reboiler 112. The second reboiler 172 can help with energy integration if the second reboiler 172 comprises a heat exchanger that pre-cools the stream ahead of the heat exchanger 100.

The equipment may include stripper section equipment. The stripper section equipment may include one or more chimney assemblies 135 (FIGS. 1-8). While falling to the bottom of the lower section 106, the liquid stream may encounter one or more of the chimney assemblies 135.

Each chimney assembly 135 includes a chimney tray 131 that collects the liquid stream within the lower section 106. The liquid stream that collects on the chimney tray 131 may be fed to the second reboiler 172. After the liquid stream is heated in the second reboiler 172, the stream may return to the middle controlled freeze zone section 106 to supply heat to the middle controlled freeze zone section 106 and/or the melt tray assembly 139. Unvaporized stream exiting the second reboiler 172 may be fed back to the distillation tower 104, 204 below the chimney tray 131. Vapor stream exiting the second reboiler 172 may be routed under or above the chimney tray 131 when the vapor stream enters the distillation tower 104, 204.

The chimney tray 131 may include one or more chimneys 137. The chimney 137 serves as a channel that the vapor stream in the lower section 106 traverses. The vapor stream travels through an opening in the chimney tray 131 at the bottom of the chimney 137 to the top of the chimney 137. The opening is closer to the bottom of the lower section 106 than it is to the bottom of the middle controlled freeze zone section 108. The top is closer to the bottom of the middle controlled freeze zone section 108 than it is to the bottom of the lower section 106.

Each chimney 137 has attached to it a chimney cap 133. The chimney cap 133 covers a chimney top opening 138 of the chimney 137. The chimney cap 133 prevents the liquid stream from entering the chimney 137. The vapor stream exits the chimney assembly 135 via the chimney top opening 138.

After falling to the bottom of the lower section 106, the liquid stream exits the distillation tower 104, 204 through the liquid outlet 160. The liquid outlet 160 is within the lower section 106. The liquid outlet 160 may be located at the bottom of the lower section 106.

After exiting through the liquid outlet 160, the bottoms stream may travel via line 28 to the first reboiler 112. The bottoms stream may be heated by the first reboiler 112 and vapor may then re-enter the lower section 106 through line 30. Unvaporized liquid may continue out of the distillation process via line 24.

The system may include an expander device 114 (FIGS. 1-8). After entering line 24, the heated liquid stream may be expanded in the expander device 114. The expander device 114 may be any suitable device, such as a valve. The valve 114 may be any suitable valve, such as a J-T valve.

The system may include a heat exchanger 116 (FIGS. 1-8). The liquid stream heated by the first reboiler 112 may be cooled or heated by the heat exchanger 116. The heat exchanger 116 may be a direct heat exchanger or an indirect heat exchanger. The heat exchanger 116 may comprise any suitable heat exchanger. The stream may exit the heat exchanger 116 through line 26.

The vapor stream in the lower section 106 may rise from the lower section 106 to the middle controlled freeze zone section 108. The vapor stream may include contaminants and hydrocarbons. The middle controlled freeze zone section 108 may be maintained to form solids from the carbon dioxide within the distillation tower 104, 204, 502 (FIG. 9). The carbon dioxide in the solids may be the contaminants that rise from the lower section 106.

The middle controlled freeze zone section 108 is constructed and arranged to separate the feed stream 10 introduced into the middle controlled freeze zone section into the solids and the vapor stream. The solids and the vapor stream are formed in the middle controlled freeze zone section 108 when a liquid stream is sprayed into the middle controlled freeze zone section 108 at a temperature and pressure at which the solids and the vapor stream form. The solids may be comprised more of contaminants than of methane. The vapor stream may comprise more methane than contaminants.

The middle controlled freeze zone section 108 includes a lower section 40 and an upper section 39 (FIGS. 2, 4 and 7-8). The lower section 40 is below the upper section 39. The lower section 40 directly abuts the upper section 39. The lower section 40 is primarily but may not exclusively be a heating section of the middle controlled freeze zone section 108. The upper section 39 is primarily but may not exclusively be a cooling section of the middle controlled freeze zone section 108. During normal operation, the temperature and pressure of the upper section 39 are chosen so that the solids can form in the middle controlled freeze zone section 108.

The middle controlled freeze zone section 108 may comprise a melt tray assembly 139 that is maintained in the middle controlled freeze zone section 108 (FIGS. 1-8). The melt tray assembly 139 is within the lower section 40 of the middle controlled freeze zone section 108. The melt tray assembly 139 is not within the upper section 39 of the middle controlled freeze zone section 108.

The melt tray assembly 139 is constructed and arranged to melt the solids in the middle controlled freeze zone section 108. When the warm vapor stream rises from the lower section 106 to the middle controlled freeze zone section 108, the vapor stream immediately encounters the melt tray assembly 139 and supplies heat to melt the solids. The melt tray assembly 139 may comprise at least one of a melt tray 118, a bubble cap 132, a liquid 130 and heat mechanism(s) 134.

The melt tray 118 may collect a liquid slurry. The melt tray 118 divides at least a portion of the middle controlled freeze zone section 108 from the lower section 106. The melt tray 118 is at the bottom 45 of the middle controlled freeze zone section 108.

One or more bubble caps 132 may act as a channel for the vapor stream rising from the lower section 106 to the middle controlled freeze zone section 108. The bubble cap 132 may provide a path for the vapor stream that forces the vapor stream up the riser 140 and then down and around the riser 140 to the melt tray 118. The riser 140 is covered by a cap 141. The cap 141 prevents the liquid 130 from travelling into the riser 140. The cap 141 helps prevent solids from travelling into the riser 140. The vapor stream's traversal through the bubble cap 132 allows the vapor stream to transfer heat to the liquid 130 within the melt tray assembly 139.

One or more heat mechanisms 134 may further heat up the liquid 130 to facilitate melting of the solids into the liquid slurry. The heat mechanism(s) 134 may be located anywhere within the melt tray assembly 139. For example, a heat mechanism 134 may be located around the bubble caps 132 (FIGS. 1-8). The heat mechanism 134 may be any suitable mechanism, such as a heat coil. The heat source of the heat mechanism 134 may be any suitable heat source.

The liquid 130 in the melt tray assembly is heated by the vapor stream. The liquid 130 may also be heated by the one or more heat mechanisms 134. The liquid 130 helps melt the solids formed in the middle controlled freeze zone section 108 into the liquid slurry. Specifically, the heat transferred by the vapor stream heats up the liquid, thereby enabling the heat to melt the solids. During normal operation, the liquid 130 is at a level sufficient to melt the solids.

The middle controlled freeze zone section 108 may also comprise a spray assembly 129. The spray assembly 129 cools the vapor stream that rises from the lower section 40. The spray assembly 129 sprays liquid, which is cooler than the vapor stream, on the vapor stream to cool the vapor stream. The spray assembly 129 is within the upper section 39. The spray assembly 129 is not within the lower section 40. The spray assembly 129 is above the melt tray assembly 139. In other words, the melt tray assembly 139 is below the spray assembly 129.

The temperature in the middle controlled freeze zone section 108 cools down as the vapor stream travels from the bottom of the middle controlled freeze zone section 108 to the top of the middle controlled freeze zone section 108. The methane in the vapor stream rises from the middle controlled freeze zone section 108 to the upper section 110. Some contaminants may remain in the methane and also rise. The contaminants in the vapor stream tend to condense or solidify with the colder temperatures and fall to the bottom of the middle controlled freeze zone section 108.

The solids form the liquid slurry when in the liquid 130. The liquid slurry flows from the middle controlled freeze zone section 108 to the lower distillation section 106. The liquid slurry flows from the bottom of the middle controlled freeze zone section 108 to the top of the lower section 106 via a line 22 (FIGS. 1-8). The line 22 may be an exterior line. The line 22 may extend from the distillation tower 104, 204. The line 22 may extend from the middle controlled freeze zone section 108. The line 22 may extend to the lower section 106.

The vapor stream that rises in the middle controlled freeze zone section 108 and does not form solids or otherwise fall to the bottom of the middle controlled freeze zone section 108, rises to the upper section 110. The upper section 110 may be maintained in the distillation tower 104, 204, 501 (FIG. 9). During normal operation, the upper section 110 operates at a temperature and pressure and contaminant concentration at which no solids form. The upper section 110 is constructed and arranged to cool the vapor stream to separate the methane from the contaminants. Reflux in the upper section 110 may cool the vapor stream. The reflux in the upper section 110 may absorb contaminants. The reflux may comprise liquid reflux. The reflux is introduced into the upper section 110 via line 18. Line 18 may extend to the upper section 110. Line 18 may extend from an outer surface of the distillation tower 104, 204.

After contacting the reflux in the upper section 110, the feed stream forms a vapor stream and a liquid stream. The vapor stream mainly comprises methane. The liquid stream comprises relatively more contaminants. The vapor stream rises in the upper section 110 and the liquid falls to a bottom of the upper section 110.

To facilitate separation of the methane from the contaminants when the stream contacts the reflux, the upper section 110 may include one or more mass transfer devices 176. Each mass transfer device 176 helps contact the liquid and vapor phases, which helps separate the methane from the contaminants. Each mass transfer device 176 may comprise any suitable contacting device, such as a tray with perforations, or a section of random or structured packing 176 to facilitate contact of the vapor and liquid phases.

After rising, the vapor stream may exit the distillation tower 104, 204 through outlet 401 to line 14. The line 14 may emanate from an upper part of the upper section 110. The line 14 may extend from an outer surface of the upper section 110.

From line 14, the vapor stream may enter a condenser 122. The condenser 122 cools the vapor stream to form a cooled stream. The condenser 122 at least partially condenses the stream.

After exiting the condenser 122, the cooled stream may enter a reflux accumulator 124. The cooled stream may be a two-phase stream. The two-phase stream may comprise a liquid stream and a vapor stream. The reflux accumulator 124 separates the two-phase stream into a liquid stream and a vapor stream. The reflux accumulator may be any suitable vessel that can separate a stream into a liquid stream and a vapor stream, such as a reflux drum. The reflux accumulator may serve as a holding unit for the cooled stream entering the reflux accumulator 124.

Once separated, the vapor stream may exit the reflux accumulator 124 as sales product. The sales product may travel through line 16 for subsequent sale to a pipeline and/or condensation to be liquefied natural gas.

Once separated, the liquid stream may return to the upper section 110 through line 18 as the reflux. The reflux may travel to the upper section 110 via any suitable mechanism, such as a reflux pump 150 (FIGS. 1-2, 5-8) or gravity (FIGS. 3-4).

The liquid stream that falls to the bottom of the upper section 110 collects at the bottom of the upper section 110 as the liquid 330. The liquid stream may collect on tray 183 (FIGS. 2, 4 and 7-8) or at the sump 331 of the upper section 110 (FIGS. 1, 3 and 5-6). The sump 331 is at the bottom portion of the upper section 110. The liquid stream collected may exit the distillation tower 104, 204 through line 20 (FIGS. 2, 4 and 7-8) or outlet 260 (FIGS. 1, 3 and 5-6). The line 20 (FIGS. 2, 4 and 7-8) may emanate from the upper section 110. The line 20 may emanate from a bottom end of the upper section 110. The line 20 may extend from an outer surface of the upper section 110.

The line 20 and/or outlet 260 connect to a line 41. The line 41 leads to the spray assembly 129 in the middle controlled freeze zone section 108. The line 41 may emanate from the holding vessel 126. While the holding vessel 126 is shown in FIGS. 1-8, the holding vessel 126 may or may not be present when the upper section 110 includes the sump 331. The line 41 may extend to an outer surface of the middle controlled freeze zone section 110.

The line 20 and/or outlet 260 may directly or indirectly (FIGS. 1-8) connect to the line 41. When the line 20 and/or outlet 260 directly connect to the line 41, the liquid spray may be pumped to the spray nozzle(s) 120 via any suitable mechanism, such as the spray pump 128 or gravity. When the line 20 and/or outlet 260 indirectly connect to the line 41, the line 20 and/or outlet 260 and line 41 may directly connect to the holding vessel 126. The holding vessel 126 may house at least some of the liquid spray before it is sprayed by the nozzle(s). The liquid spray may be pumped from the holding vessel 126 to the spray nozzle(s) 120 via any suitable mechanism, such as the spray pump 128 (FIGS. 1-8) or gravity. The holding vessel 126 may be needed when the sump 331 does not have sufficient volume to hold the liquid stream at the bottom of the upper section 110.

During an abnormal operation of the distillation tower 104, 204, the distillation tower 104, 204 does not operate at steady-state conditions. To make the distillation tower 104, 204 go from not operating at steady-state conditions to operating at steady-state conditions, the system may reduce a carbon dioxide concentration of the stream received by the upper section 110, 504 (FIG. 9). Reducing the carbon dioxide concentration may include feeding a first cryogenic fluid to the middle controlled freeze zone section 108, 505 (FIG. 9) and accumulating reflux in at least one of the holding vessel 126 and the sump 331, 506 (FIG. 9). The system may terminate reducing the carbon dioxide concentration when the carbon dioxide concentration of the stream travelling from the middle controlled freeze zone section 108 to the upper section 110 is less than or equal to a maximum carbon dioxide concentration, 507 (FIG. 9).

The carbon dioxide concentration is the concentration of carbon dioxide within the stream travelling from the middle controlled freeze zone section 108 to the upper section 110. The carbon dioxide concentration may be determined by any suitable detecting mechanism. Examples of a suitable detecting mechanism may include, but is not limited to, a gas chromatograph or an infrared detector. The detecting mechanism may sample the stream travelling from the middle controlled freeze zone section 108 to the upper section 110 from an upper portion of the middle controlled freeze zone section 108. The maximum carbon dioxide concentration may be equal to a carbon dioxide concentration in the stream travelling from the middle controlled freeze zone section 108 to the upper section 110 that is less than or equal to 6 percent (%) of the components within the stream. The maximum carbon dioxide concentration may be any number bounded by or included within the aforementioned range, such as but not limited to less than or equal to 5%, or less than or equal to 4%. The components within the stream may comprise any component within the stream (e.g., carbon dioxide, methane).

The first cryogenic fluid may comprise a substantially carbon-dioxide-free fluid. In other words, the first cryogenic fluid may not comprise carbon dioxide. For example, the first cryogenic fluid may comprise liquid natural gas or liquid nitrogen. The liquid natural gas may comprise methane.

The first cryogenic fluid may be stored in any suitable cryogenic fluid storage container 228, 247 (FIGS. 5-8). For example, the cryogenic fluid storage container 228 may comprise a tank. The cryogenic fluid storage container 228, 247 may be outside of the distillation tower 104, 204. In other words, the cryogenic fluid storage container 228, 247 may not be inside of the distillation tower 104, 204.

To feed the first cryogenic fluid to the middle controlled freeze zone section 108, the cryogenic fluid storage container 228, 247 may fluidly connect to the middle controlled freeze zone section 108 of the distillation tower 104, 204 via line 234, 263. The first cryogenic fluid may be fed from the cryogenic fluid storage container 228, 247 to a first cryogenic fluid pump 226, 246 via line 234, 263. The first cryogenic fluid may be fed from the first cryogenic fluid pump 226, 246 to a first cryogenic heat exchanger 225, 245 via line 234, 263. The first cryogenic fluid may be fed from the first cryogenic heat exchanger 225, 245 to the middle controlled freeze zone section 108.

The first cryogenic fluid pump 226, 246 may be configured to increase a pressure of a first cryogenic fluid. A pressure of the first cryogenic fluid, which enters the first cryogenic fluid pump 226, 246, is increased when the first cryogenic fluid is pumped through the first cryogenic fluid pump 226, 246. The first cryogenic fluid pump 226, 246 may increase the pressure of the first cryogenic fluid so that it can enter the distillation tower 104, 204 at a pressure closer to but above a pressure within the distillation tower 104, 204. The first cryogenic fluid pump 226, 246 may be outside of the distillation tower 104, 204. In other words, the first cryogenic fluid pump 226, 246 may not be within the distillation tower 104, 204.

The first cryogenic heat exchanger 225, 245 may be configured to receive the first cryogenic fluid. The first cryogenic heat exchanger 225, 245 may receive the first cryogenic fluid from the first cryogenic pump 226, 246. The first cryogenic heat exchanger 225, 245 may receive the first cryogenic fluid after the first cryogenic fluid exits the first cryogenic pump 226, 246. The first cryogenic heat exchanger 225, 245 may increase a temperature of the first cryogenic fluid such that the temperature of the first cryogenic fluid goes from a first temperature when it enters the first cryogenic heat exchanger 225, 245 to a second temperature when it exits the first cryogenic heat exchanger 225, 245. The second temperature may be higher than the first temperature. The first cryogenic heat exchanger 225, 245 may increase the temperature of the first cryogenic fluid so that it can enter the distillation tower 104, 204 at a temperature closer to that within the distillation tower 104, 204. The first cryogenic heat exchanger 225, 245 may be outside of the distillation tower 104, 204. In other words, the first cryogenic heat exchanger 225, 245 may not be within the distillation tower 104, 204.

The system may include a spray assembly 129, 270 that feeds the first cryogenic fluid to the middle controlled freeze zone section 108 from the first cryogenic heat exchanger 225, 245. The spray assembly 129, 270 may be configured to spray the first cryogenic fluid into the middle controlled freeze zone section 108.

The spray assembly 129, 270 may include a spray pump 128, 248 and spray nozzles 120, 240. The spray pump 128, 248 may pump the first cryogenic fluid, which exits the first cryogenic heat exchanger 225, 245, through line 232 to the spray nozzles 120, 240. In other words, the first cryogenic fluid may travel from the first cryogenic heat exchanger 225, 245 to the spray pump 128, 248 and the spray pump 128, 248 may pump the first cryogenic fluid to the spray nozzles 120, 240. The spray nozzles 120, 240 may spray the first cryogenic fluid into the middle controlled freeze zone section 108.

The spray assembly 129 may comprise a controlled freeze zone section spray assembly 129 or a cryogenic fluid pump assembly 270. The spray assembly may comprise a controlled freeze zone section spray assembly 129 when the first cryogenic fluid comprises liquid natural gas. The controlled freeze zone section spray assembly 129 is the same spray assembly that sprays the liquid spray from the upper section 110 to the middle controlled freeze zone section 108 during normal operation. The spray assembly may comprise a cryogenic fluid pump assembly 270 when the first cryogenic fluid comprises liquid nitrogen. The spray assembly 270 may be specially designed to handle the liquid nitrogen. The liquid nitrogen may be sprayed in spray assembly 270 instead of spray assembly 129 because spray assembly 129 may not be designed to handle liquid nitrogen. Liquid nitrogen tends to be colder than liquid natural gas and, therefore, may require different equipment than liquid natural gas to be sprayed. It may be possible to design the spray assembly 129 so that it can handle a first cryogenic fluid that comprises liquid nitrogen. If the spray assembly 129 is so designed, there may not be a cryogenic fluid spray assembly 270. If the spray assembly 129 is so designed it may comprise material that can handle liquid nitrogen. The material for handling liquid nitrogen may comprise any suitable material, such as but not limited to, special metal alloys like high nickel. If the spray assembly 129 is so designed it may comprise a mechanism that allows it to transition from handling liquid nitrogen to liquid natural gas and methane. The mechanism may comprise a way for initially spraying the liquid nitrogen in a dedicated spray bank and then start reducing the amount of liquid nitrogen sprayed when reflux builds up while increasing the reflux sprayed through the spray assembly 129.

When the spray assembly 129, 270 sprays the first cryogenic fluid, the carbon dioxide concentration of the stream travelling from the middle controlled freeze zone section 108 to the upper section 110 may be reduced. The concentration of carbon dioxide may be reduced because the first cryogenic fluid sprayed may lower the temperature of the carbon dioxide within the vapor stream, which is rising within the middle controlled freeze zone section 108, to one in which the carbon dioxide forms solids. When the carbon dioxide forms solids, the solids fall toward the bottom of the middle controlled freeze zone section 108 and less carbon dioxide travels from the middle controlled freeze zone section 108 to the upper section 110 because so much of the carbon dioxide falls toward the bottom of the middle controlled freeze zone section 108 as solids.

When the spray assembly 270 comprises a cryogenic fluid pump assembly 270, the system also comprises a spray assembly 129. The spray assembly 129 is the same spray assembly that sprays the liquid spray (i.e., stream) from the upper section 110 during normal operation. The spray assembly 129 may comprise a controlled freeze zone section spray assembly 129.

In addition to being the spray assembly that sprays the liquid spray, the controlled freeze zone section spray assembly 129 may receive a second cryogenic fluid that is fed to the middle controlled freeze zone section 110. The second cryogenic fluid may comprise a substantially carbon-dioxide-free fluid. The second cryogenic fluid may comprise liquid natural gas. The second cryogenic fluid may be fed to the middle controlled freeze zone section 108 sometime after the first cryogenic fluid is fed to the middle controlled freeze zone section 108 via the spray assembly 270. The second cryogenic fluid may be fed to the middle controlled freeze zone section 108 at the same time that the first cryogenic fluid is fed to the middle controlled freeze zone section 108 via the spray assembly 270.

The controlled freeze zone section spray assembly 129 receives the second cryogenic fluid the same way that the previously described controlled freeze zone section spray assembly receives the first cryogenic fluid when the first cryogenic fluid comprises liquid natural gas. Specifically, the second cryogenic fluid may be fed from a second cryogenic fluid storage container 1228 to a second cryogenic fluid pump 1226, from the second cryogenic fluid pump 1226 to a second cryogenic heat exchanger 1225, and from the second cryogenic heat exchanger 1225 to the controlled freeze zone section spray assembly 129.

The second cryogenic fluid storage container 1228 may fluidly connect to the middle controlled freeze zone section 108 of the distillation tower 104, 204 via line 1234, 1236. The second cryogenic fluid may be fed from the second cryogenic fluid storage container 1228 to the second cryogenic fluid pump 1226 via line 1234. The second cryogenic fluid may be fed from the second cryogenic fluid pump 1226 to the second cryogenic heat exchanger via line 1234.

The second cryogenic fluid pump 1226 may be configured to increase a pressure of the second cryogenic fluid. A pressure of the second cryogenic fluid, which enters the second cryogenic fluid pump 1226, is increased when the second cryogenic fluid is pumped through the second cryogenic fluid pump 1226. The second cryogenic fluid pump 1226 may be outside of the distillation tower 104, 204. In other words, the second cryogenic fluid pump 1226 may not be within the distillation tower 104, 204.

The second cryogenic heat exchanger 1225 may be configured to receive the second cryogenic fluid. The second cryogenic heat exchanger 1225 may receive the second cryogenic fluid from the second cryogenic pump 1226. The second cryogenic heat exchanger 1225 may receive the second cryogenic fluid after the second cryogenic fluid exits the second cryogenic pump 1226. The second cryogenic heat exchanger 1225 may increase a temperature of the second cryogenic fluid such that the temperature of the second cryogenic fluid goes from a first temperature when it enters the second cryogenic heat exchanger 1225 to a second temperature when it exits the second cryogenic heat exchanger 1225. The second temperature may be higher than the first temperature. The second cryogenic heat exchanger 1225 may be outside of the distillation tower 104, 204. In other words, the second cryogenic heat exchanger 1225 may not be within the distillation tower 104, 204.

The middle controlled freeze zone section 108 may receive a second cryogenic fluid from the reflux accumulator 124. The second cryogenic fluid may comprise a substantially carbon-dioxide-free fluid. The second cryogenic fluid may comprise liquid natural gas. The second cryogenic fluid may be fed from the reflux accumulator 124 to a second cryogenic fluid pump 150. The second cryogenic fluid may be fed from the second cryogenic fluid pump 150 to the middle controlled freeze zone section 108. The second cryogenic fluid may be fed from the second cryogenic fluid pump 150 to the middle controlled freeze zone section 108 via line 233, 1233, 236, 1236 and the controlled freeze zone section spray assembly 129. The second cryogenic fluid may be fed when the first cryogenic fluid is liquid natural gas or liquid nitrogen. The middle controlled freeze zone section 108 may receive the second cryogenic fluid from the reflux accumulator 124 after an initial start-up of the distillation tower 104, 204 but sometime during abnormal operation. The distillation tower 104, 204 may not receive the second cryogenic fluid during the initial start-up because the reflux accumulator 124 needs to accumulate some of the second cryogenic fluid from the stream exiting the upper section 110 so that the reflux accumulator 124 has some second cryogenic fluid to feed to the middle controlled freeze zone section 108. During the initial start-up it is unlikely that the reflux accumulator 124 will have accumulated any second cryogenic fluid to feed to the middle controlled freeze zone section 108.

The system may comprise a way for feeding a rectifier section cryogenic fluid to the upper section 110. The rectifier section cryogenic fluid may comprise a same cryogenic fluid as the first cryogenic fluid. If the rectifier section cryogenic fluid comprises a same cryogenic fluid as the first cryogenic fluid, the rectifier section cryogenic fluid and the first cryogenic fluid may be fed from the same cryogenic fluid storage container. The rectifier section cryogenic fluid may comprise a same cryogenic fluid as the second cryogenic fluid. If the rectifier section cryogenic fluid comprises a same cryogenic fluid as the second cryogenic fluid, the rectifier section cryogenic fluid and the second cryogenic fluid may be fed from the same cryogenic fluid storage container. The rectifier section cryogenic fluid may comprise a substantially carbon dioxide free fluid. The rectifier section cryogenic fluid may comprise no carbon dioxide.

Feeding the rectifier section cryogenic fluid to the upper section may comprise feeding the rectifier section cryogenic fluid from a cryogenic fluid storage container 228, 1228, 247 to a rectifier section cryogenic fluid pump 226, 1226, 246, feeding the rectifier section cryogenic fluid from the rectifier section cryogenic fluid pump 226, 1226, 246 to a rectifier section cryogenic heat exchanger 225, 1225, 245, and feeding the rectifier section cryogenic fluid from the rectifier section cryogenic heat exchanger 225, 1225, 245 to the upper section 110. The rectifier section cryogenic fluid may be fed from the rectifier section cryogenic heat exchanger 225, 1225, 245 via a line 233, 1233. The rectifier section cryogenic fluid fed from the cryogenic fluid storage container 247 to the rectifier section 100 may be fed via lines 1233, 1234. The rectifier section cryogenic fluid fed from the cryogenic fluid storage container 247 to the rectifier section 110 may be fed via lines 231, 1231, 1233, 1234. Whether the rectifier section cryogenic fluid is fed from the cryogenic fluid storage container 247 or the cryogenic fluid storage container 1228 to the rectifier section 110, line 1234 may include flow controlling device 3000; line 231, 1231 may include flow controlling device 1227. When the rectifier section cryogenic fluid is fed from the cryogenic fluid storage container 247, flow controlling device 3000 may be open and flow controlling device 1227 may be closed. When rectifier section cryogenic fluid is fed from the cryogenic fluid storage container 1228, flow controlling device 1227 may be open and flow controlling device 3000 may be closed. The flow controlling device 3000 may be any suitable device. For example, the flow controlling device 3000 may be a valve. The flow controlling device 1227 may be any suitable device. For example, the flow controlling device 1227 may be a valve.

The cryogenic fluid storage container 228, 1228, 247 may be the same storage container that the first cryogenic fluid or the second cryogenic fluid is stored in (FIGS. 5-8). If the cryogenic fluid storage container 228, 1228, 247 is the same storage container that the first cryogenic fluid is stored in, the rectifier section cryogenic fluid is the first cryogenic fluid. If the cryogenic fluid storage container 228, 1228, 247 is the same storage container that the second cryogenic fluid is stored in, the rectifier section cryogenic fluid is the second cryogenic fluid.

The rectifier section cryogenic fluid pump 226, 1226, 246 may be the same cryogenic fluid pump that the first cryogenic fluid is pumped through or that the second cryogenic fluid is pumped through. If the rectifier section cryogenic fluid pump 226, 1226, 246 is the same cryogenic fluid pump that the first cryogenic fluid is pumped through, the rectifier section cryogenic fluid is the first cryogenic fluid. If the rectifier section cryogenic fluid pump 226, 1226, 246 is the same cryogenic fluid pump that the second cryogenic fluid is pumped through, the rectifier section cryogenic fluid is the second cryogenic fluid.

The rectifier section cryogenic heat exchanger 225, 1225, 245 may be the same cryogenic heat exchanger that the first cryogenic fluid is pumped through or that the second cryogenic fluid is pumped through. If the rectifier section cryogenic heat exchanger 225, 1225, 245 is the same cryogenic heat exchanger that the first cryogenic fluid traverses through, the rectifier section cryogenic fluid is the first cryogenic fluid. If the rectifier section cryogenic heat exchanger 225, 1225, 245 is the same cryogenic heat exchanger that the second cryogenic fluid traverses through, the rectifier section cryogenic fluid is the second cryogenic fluid.

Accumulating the liquid stream in at least one of the holding vessel 126 and the sump 331 of the upper section 110 may comprise collecting the rectifier section cryogenic fluid in at least one of the holding vessel 126 and the sump 331 and/or collecting condensation of the vapor stream that travels from the middle controlled freeze zone section 108 to the upper section 110 in at least one of the holding vessel 126 and the sump 331. The rectifier section cryogenic fluid may be collected after the rectifier section cryogenic fluid is fed to the upper section 110. Initially, the rectifier section cryogenic fluid may vaporize as it cools down the rectifier section 110 as it falls through the rectifier section 110. The rectifier section cryogenic fluid may be collected after it is fed because the rectifier section cryogenic fluid includes liquid and the liquid may fall toward the bottom of the upper section 110 to be fed to the holding vessel 126 and/or to fall into the sump 331.

As liquid stream is accumulated, the amount of first cryogenic fluid and/or second cryogenic fluid fed to the middle controlled freeze zone section 108 may be reduced until no more first cryogenic fluid and/or second cryogenic fluid is fed to the middle controlled freeze zone section 108. The liquid stream may interchangeably be referred to as rectifier section stream. As rectifier section stream is accumulated, the amount of rectifier section cryogenic fluid fed to the upper section 110 may be reduced until no more rectifier section cryogenic fluid is fed to the upper section 110 because the system is at normal operation.

At least a rectifier section stream portion of the rectifier section stream in the holding vessel 126 and/or the sump 331 may be fed to the cryogenic fluid storage container 228, 1228. The rectifier section stream portion may be fed to the cryogenic fluid storage container 228, 1228 by travelling via line 231, 1231 to the cryogenic fluid storage container (FIGS. 5-8). The line 231, 1231 may include a flow controlling device 227, 1227 that restricts how much of the rectifier section stream portion may be fed to the cryogenic fluid storage container 228, 1228. The flow controlling device 227, 1227 may be any suitable device. For example, the flow controlling device 227, 1227 may be a valve. The rectifier section stream portion may be fed to or from the cryogenic fluid storage container 228, 1228 during abnormal and/or normal operation. If the rectifier section stream portion is fed to the cryogenic fluid storage container 228, 1228 during normal operation it may be because the rectifier section stream portion contains excess rectifier section stream.

The rectifier section stream portion may comprise at least one of the first cryogenic fluid, the rectifier section cryogenic fluid and the second cryogenic fluid. After being fed to the cryogenic storage container 228, 1228, the at least one of the first cryogenic fluid, the rectifier section cryogenic fluid and the second cryogenic fluid in the rectifier section stream portion may be separated from the solids in the rectifier section stream portion. The rectifier section stream portion may include solids after the rectifier section stream portion is passed through flow controlling device 227, 1227 because solids may be formed after the rectifier section stream portion passes through flow controlling device 227, 1227. The rectifier section stream portion may not include solids before the rectifier section stream portion passes through flow controlling device 227, 1227.

The rectifier section stream portion fed to the cryogenic fluid storage container 228, 1228 may comprise at least one of vapor, liquid and solids. The vapor within the cryogenic fluid storage container 228, 1228 may rise to the top of the cryogenic fluid storage container 228, 1228 and exit through the top of the cryogenic fluid storage container 228, 1228. After exiting the cryogenic fluid storage container 228, 1228, the vapor may be compressed in a compressor 238, 1238 and transported to line 16 (i.e., sales pipeline) via line 235, 1235. The liquid and/or solids in the cryogenic fluid storage container 228, 1228 may fall towards the bottom of the cryogenic fluid storage container 228, 1228. The liquid that falls may be fed to a storage unit 230, 1230 via a flow control device 229, 1229 that allows for the liquid to travel to the storage unit 230, 1230 but does not allow solids to travel to the storage unit 230, 1230. In other words, the flow control device 229, 1229 may restrict the passage of solids. The solids may collect at a bottom 290, 1290 of the cryogenic fluid storage container 228, 1228. If another abnormal operation arises, liquid from the cryogenic fluid storage container 228, 1228 may be fed to line 234, 1234 so that the cryogenic fluid can be fed to the distillation tower 104, 204 to enable restoration to normal operation. Solids that fall to the bottom of the cryogenic fluid storage container may be pumped to a flare vessel (not shown) for disposal. Ambient heating of the flare vessel may melt/ vaporize the solids.

It is important to note that the steps depicted in FIG. 9 are provided for illustrative purposes only and a particular step may not be required to perform the inventive methodology. Moreover, FIG. 9 may not illustrate all the steps that may be performed. The claims, and only the claims, define the inventive system and methodology.

Disclosed aspects may be used in hydrocarbon management activities. As used herein, "hydrocarbon management" or "managing hydrocarbons" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities. The term "hydrocarbon management" is also used for the injection or storage of hydrocarbons or $CO_2$, for example the sequestration of $CO_2$, such as reservoir evaluation, development planning, and reservoir management. The disclosed methodologies and techniques may be used in extracting hydrocarbons from a subsurface region and processing the hydrocarbons. Hydrocarbons and contaminants may be extracted from a reservoir and processed. The hydrocarbons and contaminants may be processed, for example, in the distillation tower previously described. After the hydrocarbons and contaminants are processed, the hydrocarbons may be extracted from the processor, such as the distillation tower, and produced. The contaminants may be discharged into the Earth, etc. For example, the method for producing hydrocarbons may include producing the vapor stream extracted from the distillation tower. The method may also include removing the vapor stream from the distillation tower before producing the vapor stream. The initial hydrocarbon extraction from the reservoir may be accomplished by drilling a well using hydrocarbon drilling equipment. The equipment and techniques used to drill a well and/or extract these hydrocarbons are well known by those skilled in the relevant art. Other hydrocarbon extraction activities and, more generally, other hydrocarbon management activities, may be performed according to known principles.

It should be understood that the numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

What is claimed is:

1. A method for separating fluids in a distillation tower, the method comprising:
   providing a distillation tower comprising a controlled freeze zone section and a rectifier section, wherein the controlled freeze zone section and rectifier section are configured such that a vapor stream rises up from the controlled freeze zone section to the rectifier section;
   maintaining the rectifier section in the distillation tower;

maintaining the controlled freeze zone section in the distillation tower, wherein the controlled freeze zone section forms solids from carbon dioxide within the distillation tower;

feeding a stream to the distillation tower, wherein the stream comprises the carbon dioxide;

reducing a carbon dioxide concentration of the vapor stream received by the rectifier section by:

feeding a first cryogenic fluid to the controlled freeze zone section, wherein the first cryogenic fluid comprises a substantially carbon-dioxide-free fluid; and accumulating a rectifier section stream in at least one of a holding vessel and a sump of the rectifier section; and terminating reducing the carbon dioxide concentration when the carbon dioxide concentration of the vapor stream travelling from the controlled freeze zone section to the rectifier section is less than or equal to a maximum carbon dioxide concentration.

2. The method of claim 1, wherein feeding the first cryogenic fluid comprises feeding the first cryogenic fluid from a cryogenic fluid storage container to a cryogenic fluid pump, then feeding the first cryogenic fluid from the cryogenic fluid pump to a cryogenic heat exchanger, and then feeding the first cryogenic fluid from the cryogenic heat exchanger to the controlled freeze zone section.

3. The method of claim 2, wherein feeding the first cryogenic fluid from the cryogenic heat exchanger to the controlled freeze zone section comprises spraying the first cryogenic fluid into the controlled freeze zone section.

4. The method of claim 3, wherein spraying the first cryogenic fluid comprises spraying the first cryogenic fluid via a controlled freeze zone section spray assembly of the controlled freeze zone section.

5. The method of claim 4, wherein the first cryogenic fluid comprises liquid natural gas.

6. The method of claim 3, wherein spraying the first cryogenic fluid comprises spraying the first cryogenic fluid via a cryogenic fluid spray assembly of the controlled freeze zone section and spraying a liquid stream from the rectifier section via a controlled freeze zone section spray assembly of the controlled freeze zone section.

7. The method of claim 6, wherein the first cryogenic fluid comprises liquid nitrogen.

8. The method of claim 1, wherein the maximum carbon dioxide concentration within the vapor stream comprises less than or equal to 6 percent of the stream.

9. The method of claim 1, further comprising directly feeding a rectifier section cryogenic fluid to the rectifier section.

10. The method of claim 9, wherein the first cryogenic fluid comprises a same cryogenic fluid as the rectifier section cryogenic fluid.

11. The method of claim 9, wherein the rectifier section cryogenic fluid comprises a substantially carbon dioxide free fluid.

12. The method of claim 9, wherein feeding the rectifier section cryogenic fluid comprises feeding the rectifier section cryogenic fluid from a cryogenic fluid storage container to a rectifier section cryogenic fluid pump, then feeding the rectifier section cryogenic fluid from the rectifier section cryogenic fluid pump to a rectifier section cryogenic heat exchanger and then feeding the rectifier section cryogenic fluid from the rectifier section cryogenic heat exchanger to the rectifier section.

13. The method of claim 1, further comprising feeding the rectifier section stream to a controlled freeze zone section spray assembly of the controlled freeze zone section when the carbon dioxide concentration travelling from the controlled freeze zone section to the rectifier section is less than or equal to the maximum carbon dioxide concentration.

14. The method of claim 6, further comprising reducing the carbon dioxide concentration of the stream received by the rectifier section by feeding a second cryogenic fluid to the controlled freeze zone section, wherein the second cryogenic fluid comprises a substantially carbon dioxide free fluid.

15. The method of claim 14, wherein feeding the second cryogenic fluid comprises feeding the second cryogenic fluid to a second cryogenic fluid pump, then feeding the second cryogenic fluid from the second cryogenic fluid pump to the controlled freeze zone section.

16. The method of claim 15, wherein feeding the second cryogenic fluid from the second cryogenic fluid pump to the controlled freeze zone section comprises spraying the second cryogenic fluid into the controlled freeze zone section.

17. The method of claim 14, wherein feeding the second cryogenic fluid comprises feeding the second cryogenic fluid to a second cryogenic fluid pump, then feeding the second cryogenic fluid from the second cryogenic fluid pump to a second cryogenic heat exchanger, and then feeding the second cryogenic fluid from the second cryogenic heat exchanger to the controlled freeze zone section.

18. The method of claim 17, wherein feeding the second cryogenic fluid from the second cryogenic heat exchanger to the controlled freeze zone section comprises spraying the second cryogenic fluid into the controlled freeze zone section.

19. The method of claim 16, wherein spraying the second cryogenic fluid comprises spraying the second cryogenic fluid via the controlled freeze zone section spray assembly.

20. The method of claim 14, wherein the second cryogenic fluid comprise liquid natural gas.

21. The method of claim 1, further comprising feeding a rectifier section stream portion of the rectifier section stream to a cryogenic fluid storage container.

22. The method of claim 21, wherein the rectifier section stream portion comprises at least one of the first cryogenic fluid, a second cryogenic fluid, a rectifier section cryogenic fluid and the solids.

23. The method of claim 22, further comprising separating the at least one of the first cryogenic fluid, the rectifier section cryogenic fluid and the second cryogenic fluid in the rectifier section stream portion from the solids in the rectifier section stream portion.

24. The method of claim 23, further comprising feeding the at least one of the first cryogenic fluid, the rectifier section cryogenic fluid and the second cryogenic fluid to at least one of a cryogenic fluid storage container and a sales pipeline.

25. The method of claim 23, further comprising collecting the solids at a cryogenic fluid storage container bottom of the cryogenic fluid storage container.

* * * * *